US012771257B2

(12) United States Patent
Lai

(10) Patent No.: US 12,771,257 B2
(45) Date of Patent: Oct. 20, 2026

(54) POWER CONVERTING APPARATUS AND CONVERTING METHOD THEREOF

(71) Applicant: Lite-On Technology Corporation, Taipei (TW)

(72) Inventor: Jun-Yu Lai, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 106 days.

(21) Appl. No.: 19/007,569

(22) Filed: Jan. 2, 2025

(65) Prior Publication Data

US 2026/0005617 A1 Jan. 1, 2026

Related U.S. Application Data

(60) Provisional application No. 63/665,262, filed on Jun. 28, 2024.

(30) Foreign Application Priority Data

Nov. 5, 2024 (CN) ......................... 202411569307.3

(51) Int. Cl.

| | |
|---|---|
| ***H02M 3/335*** | (2006.01) |
| ***H02M 1/00*** | (2006.01) |
| ***H02M 1/14*** | (2006.01) |
| ***H02M 1/42*** | (2007.01) |
| ***H02M 3/00*** | (2006.01) |

(52) U.S. Cl.
CPC ..... *H02M 3/33576* (2013.01); *H02M 1/0022* (2021.05); *H02M 1/14* (2013.01); *H02M 1/4208* (2013.01); *H02M 3/01* (2021.05); *H02M 3/33573* (2021.05)

(58) Field of Classification Search
CPC ........... H02M 3/33576; H02M 1/0022; H02M 3/33573; H02M 3/01; H02M 1/14; H02M 1/4208
See application file for complete search history.

(56) References Cited

U.S. PATENT DOCUMENTS 9,419,514 B1 8/2016 Xiong
10,651,757 B2 5/2020 Kitano et al.
(Continued)

FOREIGN PATENT DOCUMENTS

CN 103840646 6/2014
EP 4030605 7/2022
(Continued)

OTHER PUBLICATIONS

"Office Action of Taiwan Counterpart Application", issued on May 27, 2025, p. 1-p. 13.
(Continued)

*Primary Examiner* — Adolf D Berhane
(74) *Attorney, Agent, or Firm* — JCIPRNET

(57) ABSTRACT

A power converting apparatus and a converting method thereof are provided. A power converting apparatus includes a transformer circuit and a bridge switching circuit coupled to an input side circuit of the transformer circuit. A switching frequency control circuit generates a compensation frequency according to an input voltage of the bridge switching circuit and adjusts a switching frequency of the bridge switching circuit based on the compensation frequency.

16 Claims, 9 Drawing Sheets

(56) References Cited

U.S. PATENT DOCUMENTS

| | | | | |
|---|---|---|---|---|
| 11,420,524 | B2 * | 8/2022 | Asa | B60L 53/122 |
| 11,777,411 | B2 * | 10/2023 | Baranwal | H02M 3/335<br>363/21.02 |
| 12,531,467 | B2 * | 1/2026 | Kumar | H02M 1/007 |
| 12,614,986 | B2 * | 4/2026 | Huang | H02M 3/33573 |
| 2012/0300502 | A1 | 11/2012 | Shimada et al. | |
| 2014/0160805 | A1 | 6/2014 | Oh et al. | |
| 2017/0093297 | A1 | 3/2017 | Halberstadt | |
| 2019/0260282 | A1 | 8/2019 | Oh et al. | |
| 2022/0103080 | A1 | 3/2022 | Yang et al. | |
| 2023/0037590 | A1 | 2/2023 | Jang et al. | |

FOREIGN PATENT DOCUMENTS

| | | |
|---|---|---|
| JP | H01209981 | 8/1989 |
| TW | 202215765 | 4/2022 |

OTHER PUBLICATIONS

"Search Report of Europe Counterpart Application", issued on Jul. 15, 2025, p.1-p. 9.

* cited by examiner

POWER CONVERTING APPARATUS AND CONVERTING METHOD THEREOF

CROSS-REFERENCE TO RELATED APPLICATION

This application claims the priority benefit of U.S. provisional application Ser. No. 63/665,262, filed on Jun. 28, 2024 and China application serial no. 202411569307.3, filed on Nov. 5, 2024. The entirety of each of the above-mentioned patent applications is hereby incorporated by reference herein and made a part of this specification.

BACKGROUND

Technical Field

The disclosure relates to a power apparatus, and in particular, relates to a power converting apparatus and a converting method thereof.

Description of Related Art

Power converting apparatuses are indispensable components in modern electronic apparatuses. In a power converting apparatus using power factor correction (PFC) circuits and full-bridge CLLC resonant converters, a front-stage power factor correction circuit may increase the power factor value and provide a direct current (DC) voltage to a rear-stage CLLC resonant converter. A charging current is thereby provided. The DC voltage provided by the power factor correction circuit includes a ripple component. For instance, when a commercial power has a sine wave of 60 Hz, the DC voltage provided by the power factor correction circuit may carry a ripple component of 120 Hz. Since the linear regulation capability of the CLLC resonant converter is poor, the ripple component in the DC voltage may be reflected to the output terminal of the CLLC resonant converter, and the stability of the charging current is thus affected. In addition, when the amplitude of the ripple increases, the stress on the CLLC resonant converter increases, so the service life of the electronic component (such as a capacitor component) is decreased as a result.

SUMMARY

The disclosure is directed to a power converting apparatus and a converting method thereof through which the influence of a ripple component in a direct current (DC) voltage is lowered, a stable output current is provided, and the service life of the power converting apparatus is prolonged.

The disclosure provides a power converting apparatus including a first bridge switching circuit, a transformer circuit, and a switching frequency control circuit. An input terminal of the first bridge switching circuit receives an input voltage. The transformer circuit includes an input side circuit and an output side circuit, and the input side circuit is coupled to the first bridge switching circuit. The switching frequency control circuit generates a compensation frequency according to the input voltage and adjusts a switching frequency of the first bridge switching circuit according to the compensation frequency.

In an embodiment of the disclosure, the power converting apparatus further includes a power factor correction circuit coupled to the first bridge switching circuit and the switching frequency control circuit and provides a DC voltage to serve as the input voltage according to an input alternating current (AC) signal.

In an embodiment of the disclosure, the power converting apparatus further includes a second bridge switching circuit coupled to the output side circuit of the transformer circuit and generating an output voltage according to a voltage provided by the transformer circuit. The switching frequency control circuit adjusts a switching frequency of the second bridge switching circuit according to the compensation frequency.

In an embodiment of the disclosure, the output side circuit includes a secondary winding, a resonant capacitor, and a resonant inductor. The secondary winding is coupled to the second bridge switching circuit. The resonant inductor and the resonant capacitor are connected in series between the secondary winding and the second bridge switching circuit.

In an embodiment of the disclosure, the switching frequency control circuit includes a charging control circuit, a frequency compensation circuit, and an adder circuit. The charging control circuit generates an original switching frequency according to a target output current, a target output voltage, and an output current and the output voltage of the second bridge switching circuit. The frequency compensation circuit generates the compensation frequency according to the DC voltage and a frequency of the input AC signal. The adder circuit adds the original switching frequency and the compensation frequency to generate a control frequency to serve as the switching frequency of the first bridge switching circuit and the second bridge switching circuit.

In an embodiment of the disclosure, the power converting apparatus further includes a frequency range limiting circuit coupled to the adder circuit and limiting the control frequency within a default frequency range.

In an embodiment of the disclosure, in the default frequency range, a voltage gain of the power converting apparatus decreases as the control frequency increases.

In an embodiment of the disclosure, the switching frequency control circuit performs bandpass filtering on the DC voltage according to a frequency of the input AC signal to generate a ripple signal with a ripple frequency and generates the compensation frequency according to the ripple signal and a relationship between a voltage gain of the power converting apparatus and a control frequency.

In an embodiment of the disclosure, the ripple frequency is twice the frequency of the input AC signal.

In an embodiment of the disclosure, the input side circuit includes a primary winding, a resonant capacitor, a resonant inductor, and a magnetizing inductor. The primary winding is coupled to the first bridge switching circuit. The resonant inductor and the resonant capacitor are connected in series between the primary winding and the first bridge switching circuit. The magnetizing inductor is coupled between two ends of the primary winding.

In an embodiment of the disclosure, the switching frequency control circuit is a digital signal processor.

The disclosure further provides a converting method of a power converting apparatus including a first bridge switching circuit and a transformer circuit. An input terminal of the first bridge switching circuit receives an input voltage, the transformer circuit includes an input side circuit and an output side circuit, and the input side circuit is coupled to the first bridge switching circuit. The converting method of the power converting apparatus includes the following steps. A compensation frequency is generated according to the input voltage. A switching frequency of the first bridge switching circuit is adjusted according to the compensation frequency.

In an embodiment of the disclosure, the converting method of the power converting apparatus further includes the following step. A power factor correction circuit is provided to provide a direct current (DC) voltage to serve as the input voltage according to an input alternating current (AC) signal.

In an embodiment of the disclosure, the power converting apparatus further includes a second bridge switching circuit generating an output voltage according to a voltage provided by the transformer circuit. The converting method of the power converting apparatus includes the following step. A switching frequency of the first bridge switching circuit and the second bridge switching circuit is adjusted according to the compensation frequency.

In an embodiment of the disclosure, the output side circuit includes a secondary winding, a resonant capacitor, and a resonant inductor. The secondary winding is coupled to the second bridge switching circuit. The resonant inductor and the resonant capacitor are connected in series between the secondary winding and the second bridge switching circuit.

In an embodiment of the disclosure, the converting method of the power converting apparatus further includes the following steps. An original switching frequency is generated according to a target output current, a target output voltage, and an output current and an output voltage of the second bridge switching circuit. The compensation frequency is generated according to the DC voltage and a frequency of the input AC signal. The original switching frequency and the compensation frequency are added to generate a control frequency to serve as the switching frequency of the first bridge switching circuit and the second bridge switching circuit.

In an embodiment of the disclosure, the converting method of the power converting apparatus further includes the following step. The control frequency is limited within a default frequency range. In the default frequency range, a voltage gain of the power converting apparatus decreases as the control frequency increases.

In an embodiment of the disclosure, the converting method of the power converting apparatus further includes the following steps. Bandpass filtering is performed on the DC voltage according to a frequency of the input AC signal to generate a ripple signal with a ripple frequency. A compensation frequency is generated according to the ripple signal and a relationship between a voltage gain of the power converting apparatus and a control frequency.

In an embodiment of the disclosure, the ripple frequency is twice the frequency of the input AC signal.

In an embodiment of the disclosure, the input side circuit includes a primary winding, a resonant capacitor, a resonant inductor, and a magnetizing inductor. The primary winding is coupled to the first bridge switching circuit. The resonant inductor and the resonant capacitor are connected in series between the primary winding and the first bridge switching circuit. The magnetizing inductor is coupled between two ends of the primary winding.

Based on the above descriptions, the power converting apparatus of the embodiments of the disclosure includes a transformer circuit and a bridge switching circuit coupled to the input side circuit of the transformer circuit. The switching frequency control circuit generates the compensation frequency according to the input voltage of the bridge switching circuit and adjust the switching frequency of the bridge switching circuit according to the compensation frequency. In this way, the influence of the ripple component in the DC voltage received by the bridge switching circuit is effectively reduced, stable output current and output voltage are provided, and the service life of the power converting apparatus is prolonged.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
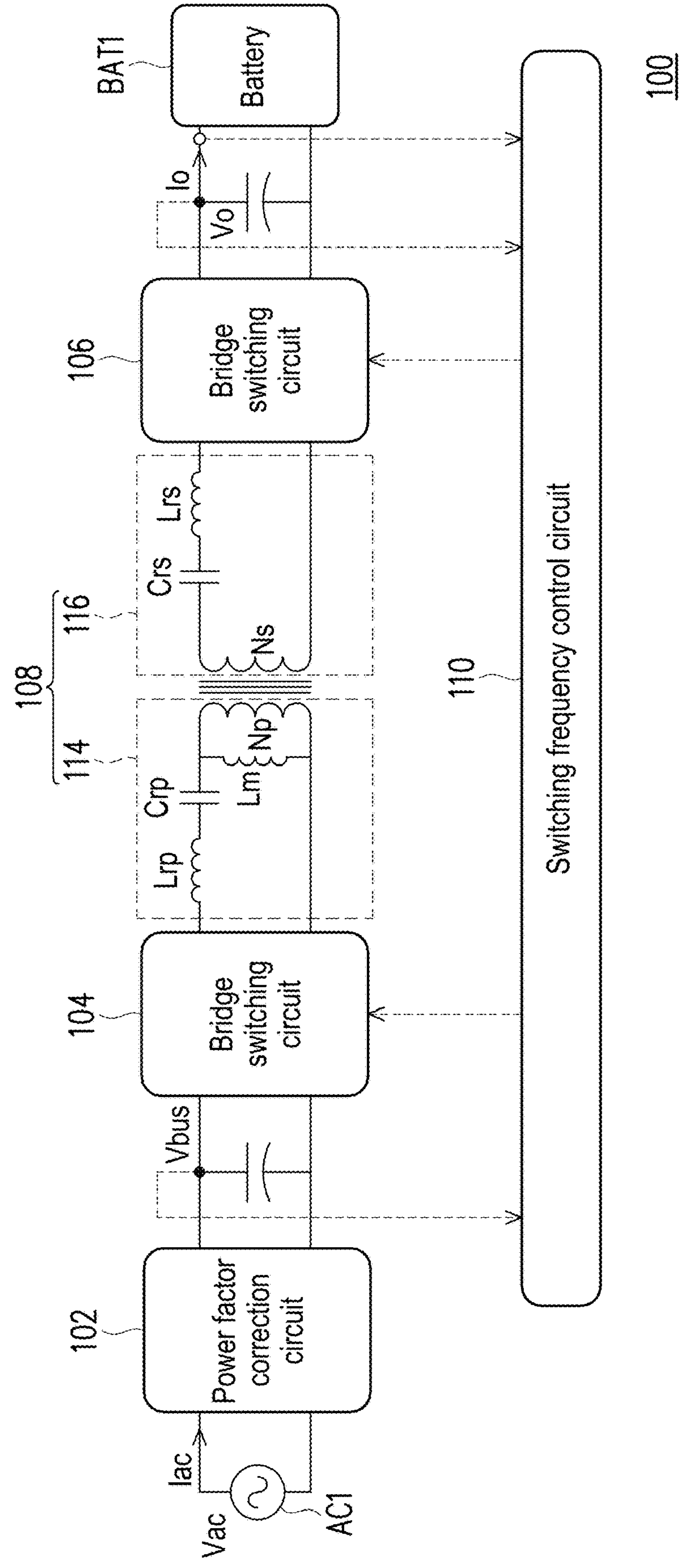
FIG. 1 is a schematic diagram of a power converting apparatus according to an embodiment of the disclosure.

In order to make the content of the disclosure more understandable, reference will now be made in detail to the present preferred embodiments of the disclosure, examples of which are illustrated in the accompanying drawings. Wherever possible, the same reference numbers are used in the drawings and the description to refer to the same or like parts.

Referring to FIG. 1 below, FIG. 1 is a schematic diagram of a power converting apparatus according to an embodiment of the disclosure. A power converting apparatus 100 may include a power factor correction circuit 102, bridge switching circuits 104 and 106, a transformer circuit 108, and a switching frequency control circuit 110. The power factor correction circuit 102 is coupled to an alternating current (AC) power source AC1 and the bridge switching circuit 104. The transformer circuit 108 is coupled to the bridge switching circuit 104 and the bridge switching circuit 106. An output terminal of the bridge switching circuit 106 is coupled to a battery BAT1. In addition, the switching frequency control circuit 110 is coupled to an output terminal of the power factor correction circuit 102, the bridge switching circuit 104, and the bridge switching circuit 106, where the bridge switching circuit 104 and the bridge switching circuit 106 may be, for example, full-bridge switching circuits.

Furthermore, the transformer circuit 108 may include an input side circuit 114 and an output side circuit 116. The input side circuit 114 may include a primary winding Np, a resonant inductor Lrp, a resonant capacitor Crp, and a magnetizing inductor Lm. The resonant inductor Lrp and the resonant capacitor Crp are connected in series between the bridge switching circuit 104 and one end of the primary winding Np, the other end of the primary winding Np is coupled to the bridge switching circuit 104. The magnetizing inductor Lm is coupled between the two ends of the primary winding Np. In addition, the output side circuit 116 may include a secondary winding Ns, a resonant inductor Lrs, and a resonant capacitor Crs. The resonant inductor Lrs and the resonant capacitor Crs are connected in series between the bridge switching circuit 106 and one end of the secondary winding Ns, and the other end of the secondary winding Ns is coupled to the bridge switching circuit 106.

The power factor correction circuit 102 may receive an input alternating current (AC) signal (such as an AC current Iac and an AC voltage Vac) provided by the AC power source AC1, provide a direct current (DC) voltage Vbus to serve as an input voltage of the bridge switching circuit 104 according to the input AC signal, and provide the DC voltage Vbus to the switching frequency control circuit 110. Furthermore, the power factor correction circuit 102 may adjust an AC current waveform it receives to improve a power factor value and reduce power consumption. The switching frequency control circuit 110 may control a switching operation of the bridge switching circuits 104 and 106. In some embodiments, the bridge switching circuit 104 converts DC to AC waveform, and the second bridge switching circuit 106 converts AC to DC waveform. The transformer circuit 108 may convert a voltage provided by the bridge switching circuit 104 to generate an output voltage Vo and an output current Io at the output terminal of the bridge switching circuit 106. The switching frequency control circuit 110 may generate a compensation frequency according to the DC voltage Vbus and adjust the switching frequency of the bridge switching circuits 104 and 106 according to the compensation frequency to reduce a ripple component included in the DC voltage Vbus that affects the stability of the output current Io and the output voltage Vo, so that a service life of the power converting apparatus 100 is prolonged. It should be noted that in some embodiments, the power converting apparatus 100 may also include only one bridge switching circuit 104. In this case, the switching frequency control circuit 110 may also generate a compensation frequency based on the DC voltage Vbus and adjust the switching frequency of the bridge switching circuit 104 based on the compensation frequency. In this way, the stable output current Io and output voltage Vo are provided.

Furthermore, the switching frequency control circuit 110 may perform bandpass filtering on the DC voltage Vbus according to a frequency of the input AC signal to generate a ripple signal with a ripple frequency and generate a compensation frequency according to the ripple signal and a relationship between a voltage gain of the power converting apparatus 100 and a control frequency of the bridge switching circuits 104 and 106 (i.e., the switching frequency of the bridge switching circuits 104 and 106). For example, if the input AC signal is a sine wave with a frequency of 60 Hz, the ripple frequency may be, for example, 120 Hz, which is twice the frequency of the input AC signal, but the disclosure is not limited thereto. The voltage gain of the power converting apparatus 100 is equal to the output voltage Vo of the bridge switching circuit 106 divided by the input voltage (DC voltage Vbus) of the bridge switching circuit.

Figure 2:
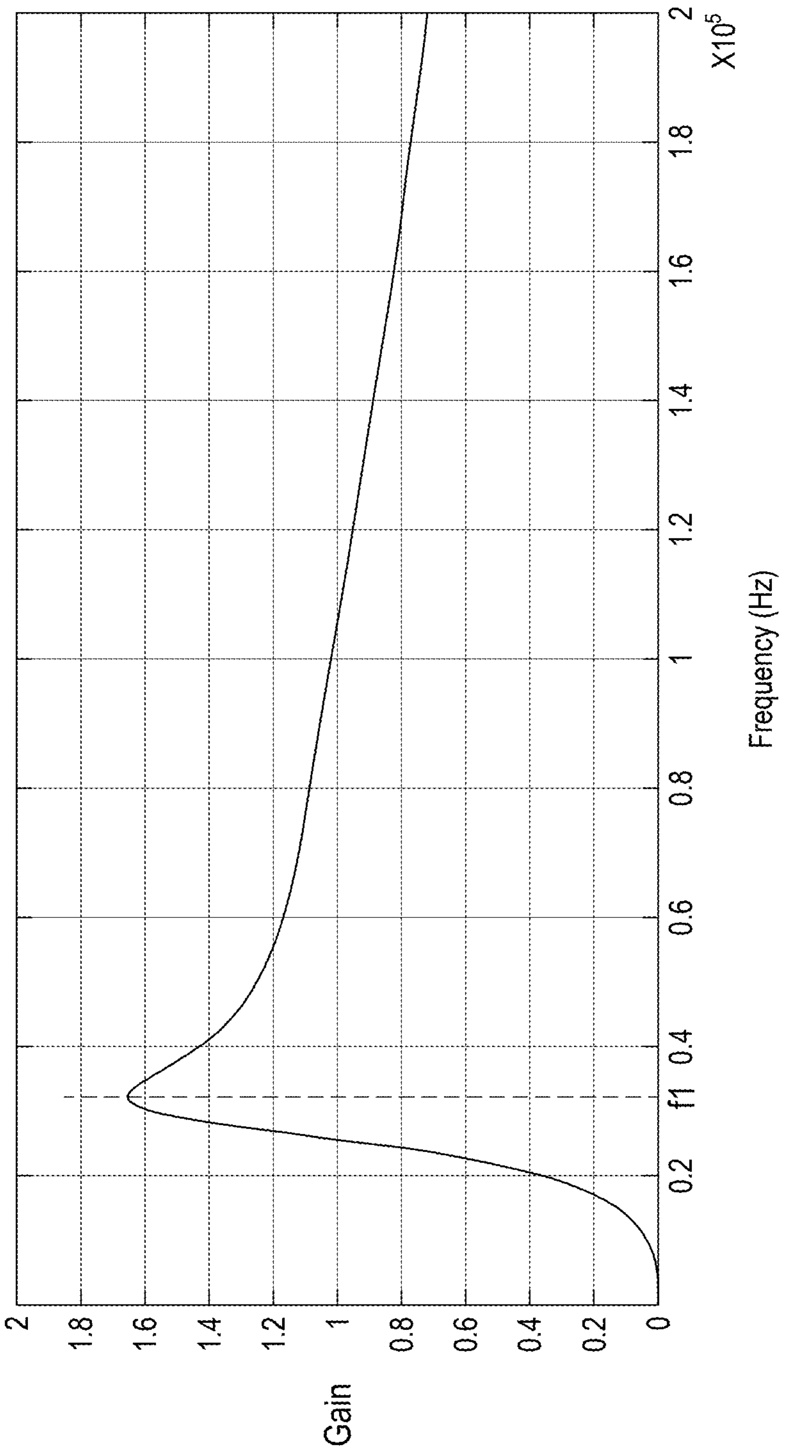
FIG. 2 is a schematic diagram of a relationship between a voltage gain of the power converting apparatus and a control frequency of bridge switching circuits according to an embodiment of the disclosure.

FIG. 2 is a schematic diagram of the relationship between the voltage gain of the power converting apparatus and the control frequency of the bridge switching circuits according to an embodiment of the disclosure. The relationship between the voltage gain and the control frequency shown in FIG. 2 is obtained when the power converting apparatus 100 uses a designed specific circuit parameter and is connected to a designed specific load. The relationship between the voltage gain and the control frequency of the power converting apparatus 100 may be as shown in FIG. 2. When the control frequency is greater than f1, the voltage gain decreases as the control frequency increases, so that the switching frequency control circuit 110 may adjust the voltage gain by adjusting the control frequency, thereby controlling the output voltage Vo. For example, when the DC voltage Vbus increases, increasing the control frequency can suppress the increase of the output voltage Vo. Conversely, when the DC voltage Vbus decreases, decreasing the control frequency can suppress the decrease of the output voltage Vo. Similarly, the switching frequency control circuit 110 may adjust the control frequency of the bridge switching circuit 106 according to the ripple signal, so as to suppress the influence of the ripple component in the DC voltage Vbus on the output voltage Vo and the output current Io. A stable output current is thereby provided and the service life of the power converting apparatus 100 is prolonged.

Figure 3:
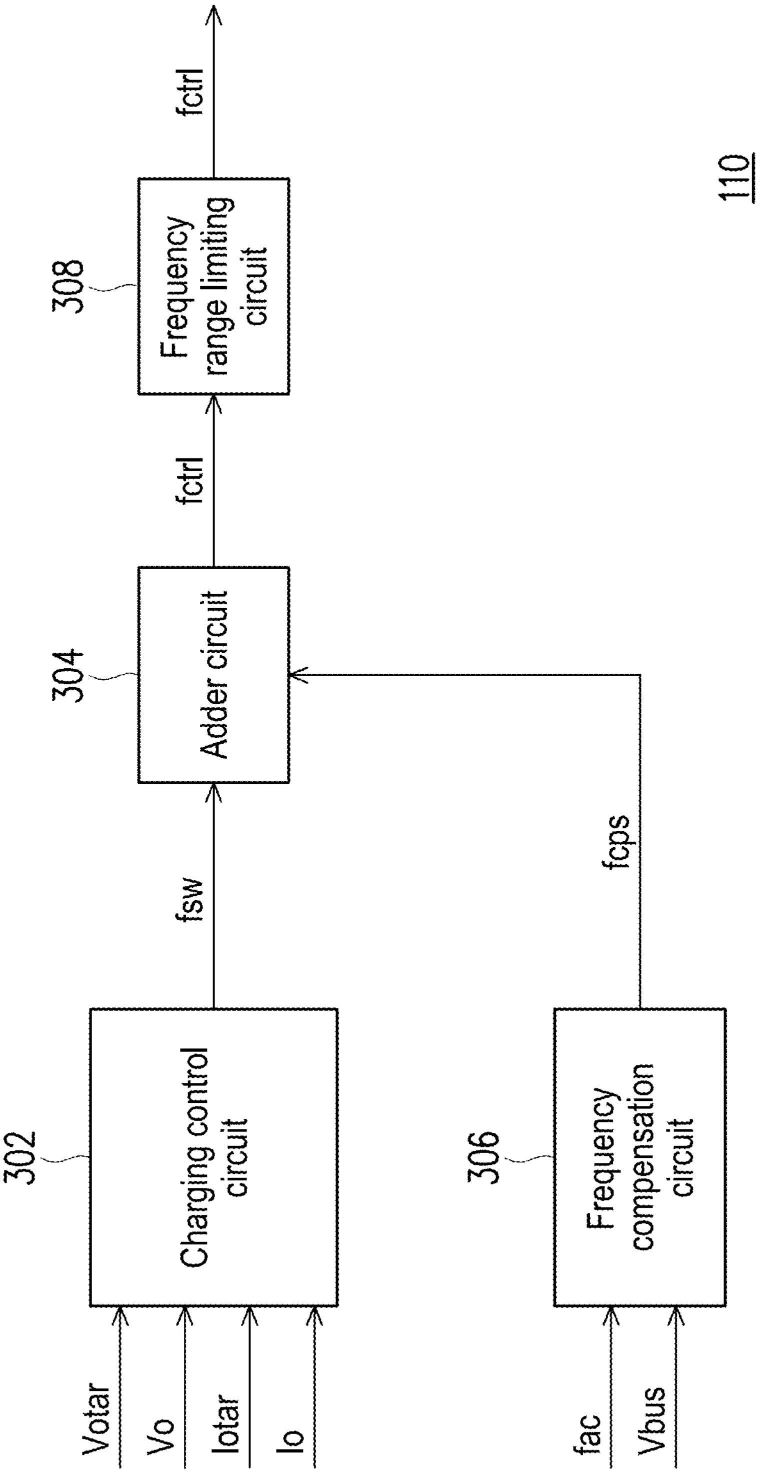
FIG. 3 is a schematic diagram of a switching frequency control circuit according to an embodiment of the disclosure.
Figure 4:
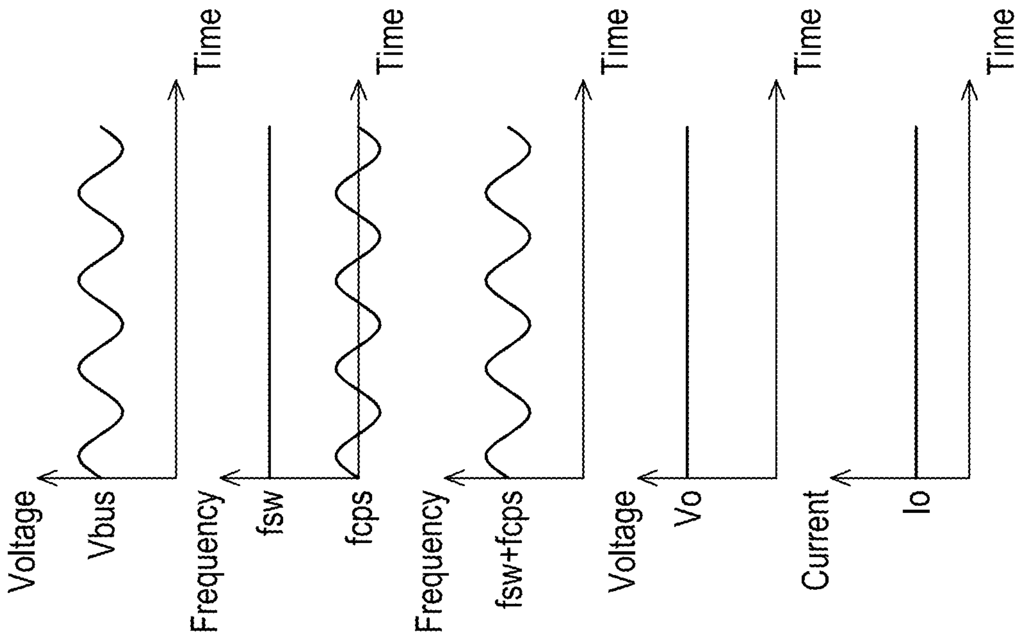
FIG. 4 to FIG. 6 are operation sequence diagrams of the power converting apparatus according to an embodiment of the disclosure.

In detail, the implementation of the switching frequency control circuit 110 may be as shown in FIG. 3, and a charging control circuit 302, an adder circuit 304, a frequency compensation circuit 306, and a frequency range limiting circuit 308 are included. The adder circuit 304 is coupled to the charging control circuit 302, the frequency compensation circuit 306, and the frequency range limiting circuit 308. The charging control circuit 302 may generate an original switching frequency fsw according to a target output current Iotar, a target output voltage Votar, the output current Io, and the output voltage Vo. The original switching frequency fsw is used to control the output current Io and the output voltage Vo to be close to or equal to the target output current Iotar and the target output voltage Votar. The frequency compensation circuit 306 may generate a compensation frequency fcps (as shown in FIG. 4) according to the DC voltage Vbus and a frequency fac of the input AC signal (such as the AC current Iac and the AC voltage Vac), where the compensation frequency fcps may be a digital signal. More specifically, some signals (such as the output current Io, the output voltage Vo, and the DC voltage Vbus) have been converted (such as by an analog-to-digital converter) from the original detected signals into digital signals. The switching frequency control circuit 110 is a digital signal processor. The target output current Iotar, the target output voltage Votar, the output current Io, the output voltage Vo, the DC voltage Vbus, and the frequency fac of the input AC signal read by the switching frequency control circuit 110 are all digital signals. Compared with an analog circuit, a digital signal processor is more flexible in subsequent adjustments. For example, when adjusting parameters (the frequency fac of the AC signal, filter parameters or other parameters), there is no need to change passive components, and it can also save space. For example, the frequency compensation circuit 306 may obtain a center frequency for performing bandpass filtering on the DC voltage Vbus based on the frequency fac of the input AC signal. For example, when the frequency fac of the input AC signal is 60 Hz, the center frequency for performing bandpass filtering on the DC voltage Vbus may be set to 120 Hz, but the disclosure it is not limited thereto. The frequency compensation circuit 306 may perform bandpass filtering on the DC voltage Vbus to generate a ripple signal with a ripple frequency and generate the compensation frequency fcps according to the ripple signal and the relationship between the voltage gain of the power converting apparatus 100 and the control frequency. The adder circuit 304 may add the original switching frequency fsw and the compensation frequency fcps to generate a control frequency fctrl to serve as the switching frequency of the bridge switching circuit 104 and the bridge switching circuit 106.

As described in the embodiment of FIG. 2, when the control frequency is greater than f1, the voltage gain decreases as the control frequency increases. When a voltage of the ripple signal increases, increasing the control frequency can suppress the increase of the output voltage Vo. When the voltage of the ripple signal decreases, decreasing the control frequency can suppress the decrease of the output voltage Vo. Therefore, as shown in FIG. 4, by adding the compensation frequency fcps that changes in response to the change of the voltage gain to the original switching frequency fsw to adjust the control frequency fctrl, the voltage gain of the power converting apparatus 100 may be adjusted in response to the voltage change of the ripple signal. In this way, the influence of the ripple component in the DC voltage Vbus on the output voltage Vo and the output current Io is suppressed, and accordingly, stable output current Io and output voltage Vo are provided, and the service life of the power converting apparatus 100 is prolonged.

Figure 5:
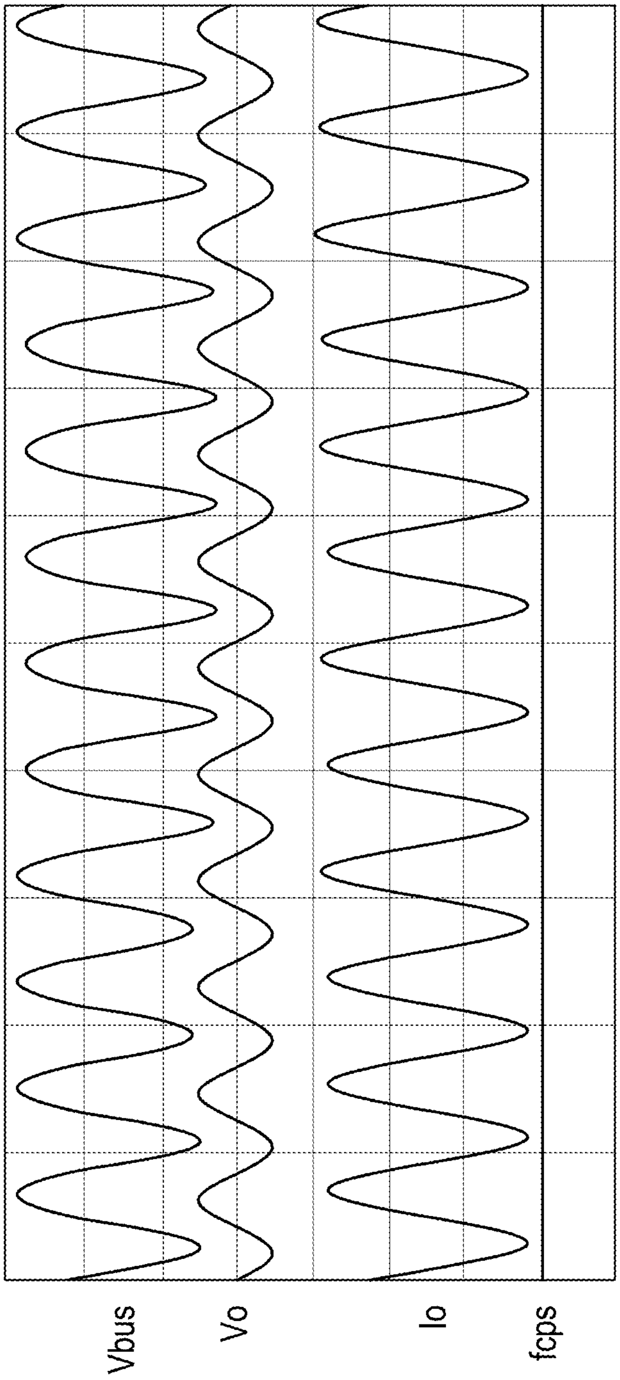
Figure 6:
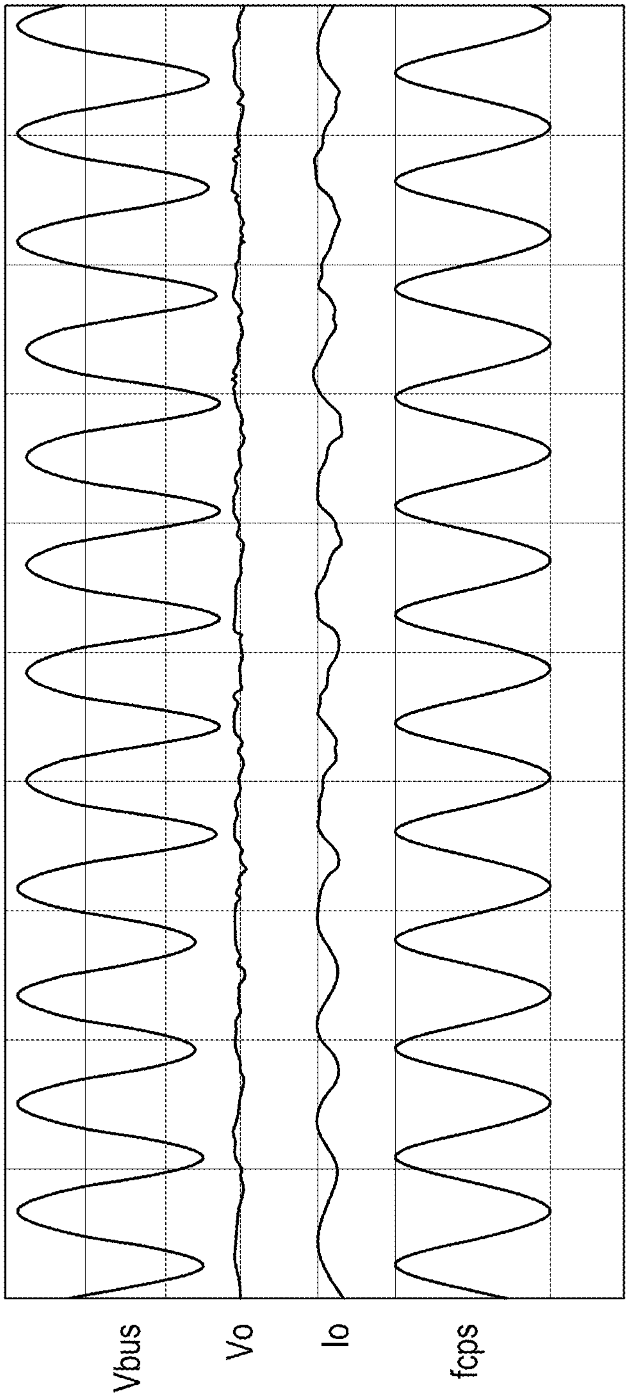

As another example, as shown in FIG. 5 and FIG. 6, in the embodiment of FIG. 5, the compensation frequency fcps is 0, i.e., the frequency compensation circuit 306 does not provide a compensation frequency, while in the embodiment of FIG. 6, the frequency compensation circuit 306 provides a compensation frequency. It may be seen from the embodiments of FIGS. 5 and 6 that after the frequency compensation circuit 306 provides the compensation frequency to adjust the control frequency fctrl, fluctuations of the output current Io and the output voltage Vo are significantly reduced. Namely, the influence of the ripple component in the DC voltage Vbus on the output voltage Vo and the output current Io has been effectively suppressed, so that the stable output current Io and output voltage Vo may be provided.

In addition, in order to ensure that the control frequency fctrl falls within an appropriate frequency range, the frequency range limiting circuit 308 may limit the control frequency fctrl to a default frequency range, where within the default frequency range, the voltage gain of the power converting apparatus 100 decreases as the control frequency fctrl increases. The default frequency range may be, for example, a frequency range greater than the frequency f1 in FIG. 2, but the disclosure is not limited thereto.

Figure 7:
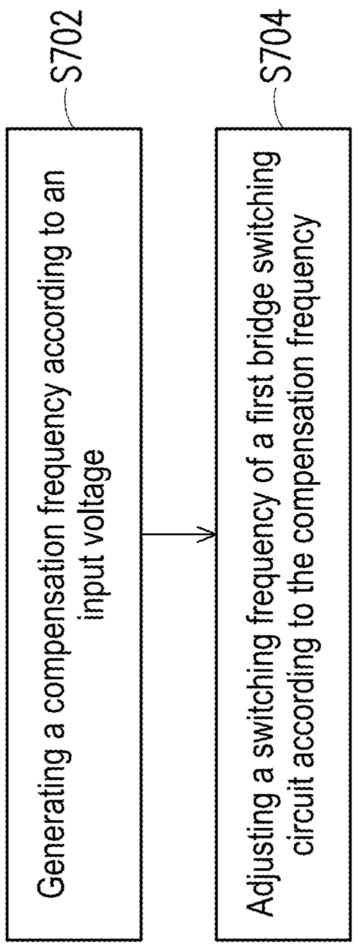
FIG. 7 to FIG. 9 are flow charts of a converting method of the power converting apparatus according to an embodiment of the disclosure.

FIG. 7 is a flow chart of a converting method of a power converting apparatus according to an embodiment of the disclosure. The power converting apparatus includes a first bridge switching circuit and a transformer circuit. An input terminal of the first bridge switching circuit receives an input voltage. The transformer circuit includes an input side circuit and an output side circuit. The input side circuit is coupled to the first bridge switching circuit, and the output side circuit is configured to provide an output voltage and an output current. From the above embodiments, it may be seen that the converting method of the power converting apparatus may at least include the following steps. First, a compensation frequency is generated according to the input voltage (step S702), and then the switching frequency of the first bridge switching circuit is adjusted according to the compensation frequency (step S704), so as to reduce the influence of the ripple component in the DC voltage on the output current and the output voltage.

Figure 8:
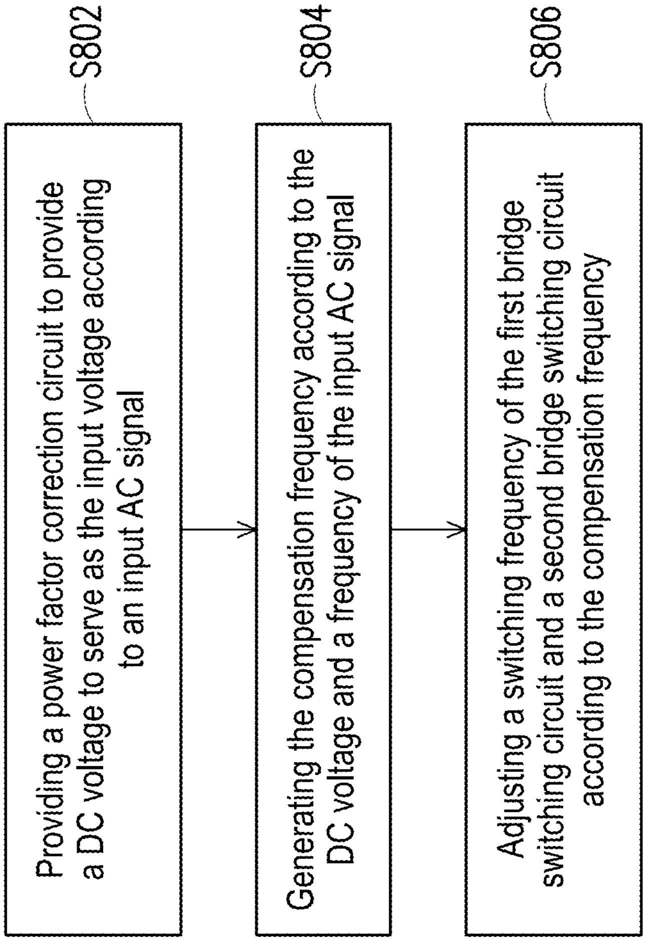

In other embodiments, the power converting apparatus may further include a power factor correction circuit and a second bridge switching circuit. The input side circuit of the transformer circuit may include a primary winding, a resonant inductor, a resonant capacitor, and a magnetizing inductor. The resonant inductor and the resonant capacitor are connected in series between the first bridge switching circuit and one end of the primary winding. The other end of the primary winding is coupled to the first bridge switching circuit, and the magnetizing inductor is coupled between the two ends of the primary winding. In addition, the output side circuit may include a secondary winding, a resonant inductor, and a resonant capacitor. The resonant inductor and the resonant capacitor are connected in series between the second bridge switching circuit and one end of the secondary winding, and the other end of the secondary winding is coupled to the second bridge switching circuit. An output terminal of the second bridge switching circuit is configured to provide an output voltage and an output current. As shown in FIG. 8, the converting method of the power converting apparatus may include the following step. A power factor correction circuit is provided to provide a DC voltage to serve as an input voltage of the first bridge switching circuit according to an input AC signal provided by an AC power source (step S802). Then, a compensation frequency is generated according to the DC voltage output by the power factor correction circuit and the frequency of the input AC signal provided by the AC power supply (step S804), and the switching frequency of the first bridge switching circuit and the second bridge switching circuit is adjusted according to the compensation frequency (step S806).

Figure 9:
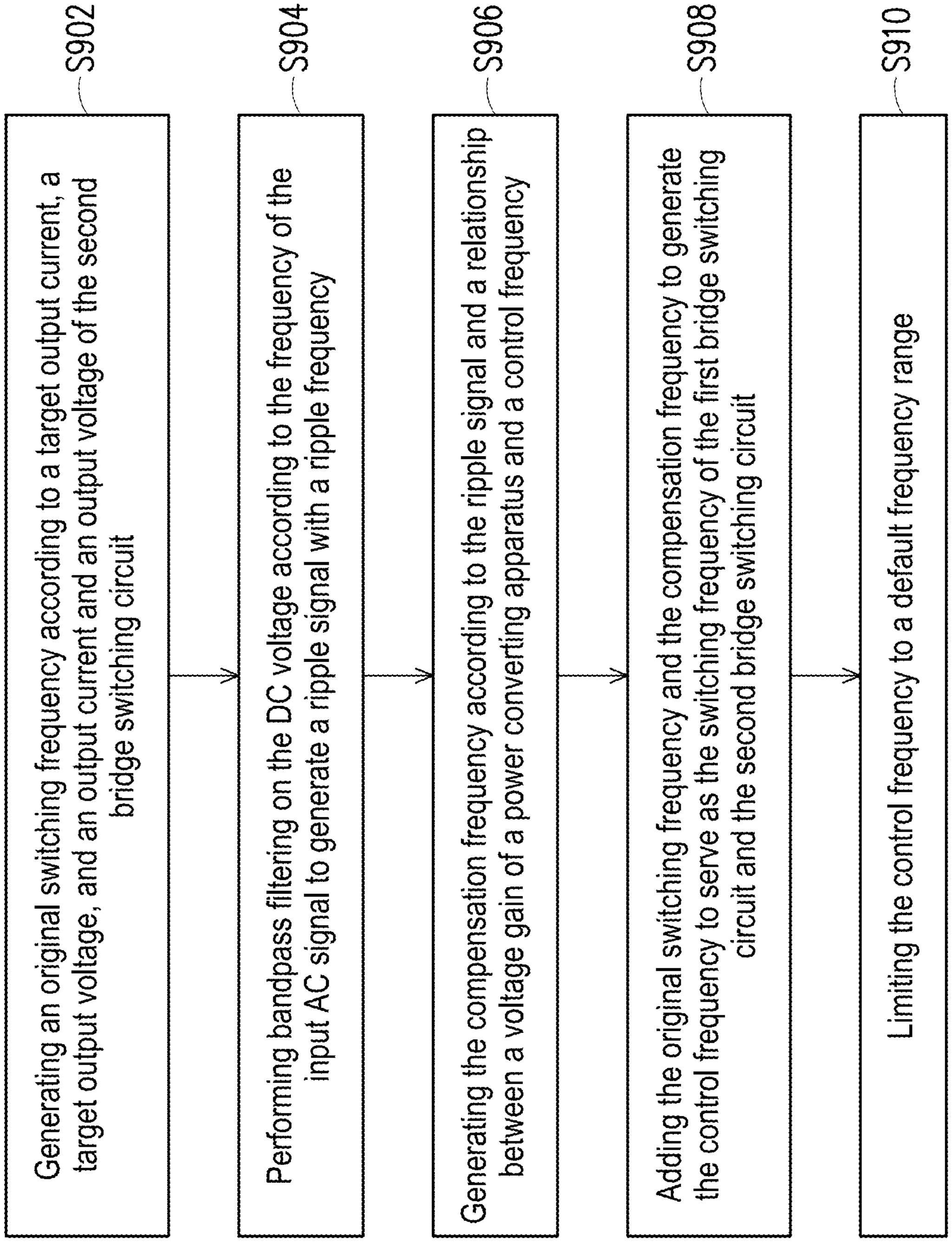

Further, a method for adjusting the switching frequency of the first bridge switching circuit and the second bridge switching circuit may be as shown in FIG. 9. First, an original switching frequency is generated according to a target output current, a target output voltage, and an output current and an output voltage of the second bridge switching circuit (step S902). The original switching frequency is configured to control the output current and the output voltage of the second bridge switching circuit to be close to or equal to the target output current and the target output voltage. Next, bandpass filtering is performed on the DC voltage outputted by the power factor correction circuit according to a frequency of the input AC signal to generate a ripple signal with a ripple frequency (step S904). The ripple frequency is, for example, twice the frequency of the input AC signal, but the disclosure is not limited thereto. Next, a compensation frequency is generated according to the ripple signal and a relationship between the voltage gain of the power converting apparatus and the control frequency (step S906). Thereafter, the original switching frequency and the compensation frequency are added to generate a control frequency to serve as the switching frequency of the first bridge switching circuit and the second bridge switching circuit (step S908). In the embodiment, the control frequency may also be limited to a default frequency range (step S910) to ensure that the influence of the ripple component in the DC voltage on the output current and the output voltage is suppressed, where within the default frequency range, the voltage gain of the power converting apparatus decreases as the control frequency increases.

In summary, the power converting apparatus of the embodiments of the disclosure includes the transformer circuit and the bridge switching circuit coupled to the input side circuit of the transformer circuit. The switching frequency control circuit may generate the compensation frequency according to the input voltage of the bridge switching circuit and adjust the switching frequency of the bridge switching circuit according to the compensation frequency. In this way, the influence of the ripple component in the DC voltage received by the bridge switching circuit is effectively reduced, stable output current and output voltage are provided, and the service life of the power converting apparatus is prolonged. In some embodiments, the power converting apparatus may also include the bridge switching circuit coupled to the output side circuit of the transformer circuit. The switching frequency of the bridge switching circuits coupled to the input side circuit and the output side circuit is adjusted according to the compensation frequency. In this way, the influence of the ripple component in the DC voltage is effectively reduced as well.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A power converting apparatus, comprising:

a first bridge switching circuit having an input terminal receiving an input voltage;

a transformer circuit comprising an input side circuit and an output side circuit, wherein the input side circuit is coupled to the first bridge switching circuit;

a switching frequency control circuit generating a compensation frequency according to the input voltage and adjusting a switching frequency of the first bridge switching circuit according to the compensation frequency; and a power factor correction circuit coupled to the first bridge switching circuit and the switching frequency control circuit and providing a direct current (DC) voltage to serve as the input voltage according to an input alternating current (AC) signal, wherein the switching frequency control circuit performs bandpass filtering on the DC voltage according to a frequency of the input AC signal to generate a ripple signal with a ripple frequency, and the switching frequency control circuit generates the compensation frequency according to the ripple signal and a relationship between a voltage gain of the power converting apparatus and a control frequency.

2. The power converting apparatus according to claim 1, further comprising:

a second bridge switching circuit coupled to the output side circuit of the transformer circuit and generating an output voltage according to a voltage provided by the transformer circuit, wherein the switching frequency control circuit adjusts a switching frequency of the second bridge switching circuit according to the compensation frequency.

3. The power converting apparatus according to claim 2, wherein the output side circuit comprises:

a secondary winding coupled to the second bridge switching circuit;

a resonant capacitor; and a resonant inductor connected in series with the resonant capacitor between the secondary winding and the second bridge switching circuit.

4. The power converting apparatus according to claim 2, wherein the switching frequency control circuit comprises:

a charging control circuit generating an original switching frequency according to a target output current, a target output voltage, and an output current and the output voltage of the second bridge switching circuit;

a frequency compensation circuit generating the compensation frequency according to the DC voltage and a frequency of the input AC signal; and an adder circuit adding the original switching frequency and the compensation frequency to generate a control frequency to serve as the switching frequency of the first bridge switching circuit and the second bridge switching circuit.

5. The power converting apparatus according to claim 4, further comprising:

a frequency range limiting circuit coupled to the adder circuit and limiting the control frequency within a default frequency range.

6. The power converting apparatus according to claim 5, wherein in the default frequency range, a voltage gain of the power converting apparatus decreases as the control frequency increases.

7. The power converting apparatus according to claim 1, wherein the ripple frequency is twice the frequency of the input AC signal.

8. The power converting apparatus according to claim 1, wherein the input side circuit comprises:

a primary winding coupled to the first bridge switching circuit;

a resonant capacitor;

a resonant inductor coupled in series with the resonant capacitor between the primary winding and the first bridge switching circuit; and a magnetizing inductor coupled between two ends of the primary winding.

9. The power converting apparatus according to claim 1, wherein the switching frequency control circuit is a digital signal processor.

10. A converting method of a power converting apparatus, wherein the power converting apparatus comprises a first bridge switching circuit and a transformer circuit, wherein an input terminal of the first bridge switching circuit receives an input voltage, the transformer circuit comprises an input side circuit and an output side circuit, the input side circuit is coupled to the first bridge switching circuit, and the converting method of the power converting apparatus comprising:

generating a compensation frequency according to the input voltage;

adjusting a switching frequency of the first bridge switching circuit according to the compensation frequency;

providing a power factor correction circuit to provide a direct current (DC) voltage to serve as the input voltage according to an input alternating current (AC) signal;

performing bandpass filtering on the DC voltage according to a frequency of the input AC signal to generate a ripple signal with a ripple frequency; and generating the compensation frequency according to the ripple signal and a relationship between a voltage gain of the power converting apparatus and a control frequency.

11. The converting method of the power converting apparatus according to claim 10, wherein the power converting apparatus further comprises a second bridge switching circuit, the second bridge switching circuit generates an output voltage according to a voltage provided by the transformer circuit, and the converting method of the power converting apparatus comprises:

adjusting a switching frequency of the second bridge switching circuit according to the compensation frequency.

12. The converting method of the power converting apparatus according to claim 11, wherein the output side circuit comprises:

a secondary winding coupled to the second bridge switching circuit;

a resonant capacitor; and a resonant inductor connected in series with the resonant capacitor between the secondary winding and the second bridge switching circuit.

13. The converting method of the power converting apparatus according to claim 11, further comprising:

generating an original switching frequency according to a target output current, a target output voltage, and an output current and an output voltage of the second bridge switching circuit;

generating the compensation frequency according to the DC voltage and a frequency of the input AC signal; and adding the original switching frequency and the compensation frequency to generate a control frequency to serve as the switching frequency of the first bridge switching circuit and the second bridge switching circuit.

14. The converting method of the power converting apparatus according to claim 13, further comprising:

limiting the control frequency within a default frequency range, wherein in the default frequency range, a voltage gain of the power converting apparatus decreases as the control frequency increases.

15. The converting method of the power converting apparatus according to claim 10, wherein the ripple frequency is twice the frequency of the input AC signal.

16. The converting method of the power converting apparatus according to claim 10, wherein the input side circuit comprises:

a primary winding coupled to the first bridge switching circuit;

a resonant capacitor;

a resonant inductor connected in series with the resonant capacitor between the primary winding and the first bridge switching circuit; and a magnetizing inductor coupled between two ends of the primary winding.

* * * * *